US008542387B2

(12) United States Patent  
Mizuno

(10) Patent No.: US 8,542,387 B2
(45) Date of Patent: Sep. 24, 2013

(54) PRINTING APPARATUS, PRINTING SYSTEM AND PRINTER DRIVER

(75) Inventor: Nobuhiro Mizuno, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 346 days.

(21) Appl. No.: 13/012,774

(22) Filed: Jan. 24, 2011

(65) Prior Publication Data

US 2011/0181914 A1 Jul. 28, 2011

(30) Foreign Application Priority Data

Jan. 28, 2010 (JP) ................................. 2010-017136

(51) Int. Cl.
G06F 3/12 (2006.01)
G06F 15/00 (2006.01)
G06K 1/00 (2006.01)

(52) U.S. Cl.
USPC ........................... 358/1.15; 358/1.13; 358/1.9

(58) Field of Classification Search
None
See application file for complete search history.

(56) References Cited

U.S. PATENT DOCUMENTS

| 7,031,014 | B2* | 4/2006 | Ohwa ........................... 358/1.18 |
| 7,826,077 | B2 | 11/2010 | Tamai et al. |
| 7,958,278 | B2 | 6/2011 | Takada et al. |
| 2003/0227651 | A1* | 12/2003 | Mathieson ................... 358/1.16 |
| 2004/0162779 | A1* | 8/2004 | Kramer ........................... 705/40 |
| 2006/0085567 | A1 | 4/2006 | Takada et al. |
| 2006/0268310 | A1* | 11/2006 | Tamai et al. ................. 358/1.14 |
| 2007/0185829 | A1* | 8/2007 | Jansen et al. ..................... 707/1 |
| 2008/0106758 | A1 | 5/2008 | Kazume |
| 2009/0009803 | A1* | 1/2009 | Takeuchi et al. ............. 358/1.15 |
| 2009/0021789 | A1 | 1/2009 | Sugimoto |
| 2009/0086261 | A1 | 4/2009 | Irino |
| 2009/0168095 | A1 | 7/2009 | Watanabe |

FOREIGN PATENT DOCUMENTS

| JP | 2006-027170 A | 2/2006 |
| JP | 2006-110860 A | 4/2006 |
| JP | 2006-319413 A | 11/2006 |
| JP | 2007-001041 A | 1/2007 |
| JP | 2007-076187 A | 3/2007 |
| JP | 2008-090737 A | 4/2008 |
| JP | 2008-119833 A | 5/2008 |
| JP | 2009-023208 A | 2/2009 |
| JP | 2009-098953 A | 5/2009 |
| JP | 2009-099130 A | 5/2009 |
| JP | 2009-157826 A | 7/2009 |

OTHER PUBLICATIONS

Japan Patent Office, Notification of Reason for Refusal for Japanese Patent Application No. 2010-017136 (counterpart to above-captioned patent application), dispatched Jan. 26, 2012.

* cited by examiner

Primary Examiner — Ming Hon
(74) Attorney, Agent, or Firm — Baker Botts L.L.P.

(57) ABSTRACT

A printing apparatus having an input unit through which a print-job is input; a printing unit, which executes the print-job input through the input unit, and which prints an image onto a recording medium; a connecting unit that is connectable to a removable storage medium; and a control unit, which reads identification information of the print-job from the connected removable storage medium when the removable storage medium is connected to the connecting unit, and which causes the printing unit to execute the print-job identified by the read identification information with priority over at least one print-job that starts being input to the input unit at a time earlier than when the print-job identified by the read identification information started being input.

7 Claims, 15 Drawing Sheets

PRINTING APPARATUS, PRINTING SYSTEM AND PRINTER DRIVER

CROSS-REFERENCE TO RELATED APPLICATION

This application claims priority from Japanese Patent Application No. 2010-017136 filed on Jan. 28, 2010, the entire subject matter of which is incorporated herein by reference.

BACKGROUND

1. Technical Field

The invention relates to a printing apparatus, a printing system, and a printer driver.

2. Related Art

It is known a related image forming apparatus that sets priority of print-jobs from host apparatuses. When the reception request for printing data is generated from other host apparatus during processing of a print-job from a predetermined host apparatus, the related image forming apparatus controls whether to respond to the reception request or to continue processing the print-job being processed based on the priorities of print-jobs of the host apparatus being processed and the host apparatus which transmits the reception request.

SUMMARY

However, in the related image forming apparatus, the priorities are allocated each of the host apparatuses. Accordingly, in order to transmit a higher priority print-job, a user has to transmit the higher priority print-job from the higher priority host apparatus, thereby causing inconvenience to the user.

The present invention is made in consideration of the above and to provide a printing apparatus, a printing system, and a printer driver executing the intended print-job with priority by using simple operation.

A printing apparatus having: an input unit through which a print-job is input; a printing unit, which executes the print-job input through the input unit, and which prints an image onto a recording medium; a connecting unit that is connectable to a removable storage medium; and a control unit, which reads identification information of the print-job from the connected removable storage medium when the removable storage medium is connected to the connecting unit, and which causes the printing unit to execute the print-job identified by the read identification information with priority over at least one print-job that starts being input to the input unit at a time earlier than when the print-job identified by the read identification information started being input.

According to one aspect of the present invention, just by connecting a storage medium storing identification information of the intended print-job to the connecting unit of the printing apparatus, the user who wants to execute the intended print-job with priority over other print-jobs may execute the intended print-job with priority over at least one print-job which starts to be input to the input unit of the printing apparatus earlier than the intended print-job. Accordingly, the intended print-job may be executed with priority over other print-jobs by using simple operations.

DETAILED DESCRIPTION OF THE EXEMPLARY EMBODIMENTS

<Exemplary Embodiment 1>

The exemplary embodiment 1 will be described with reference to FIGS. 1 to 12.

(1) Configuration of a Printing System

Figure 1:
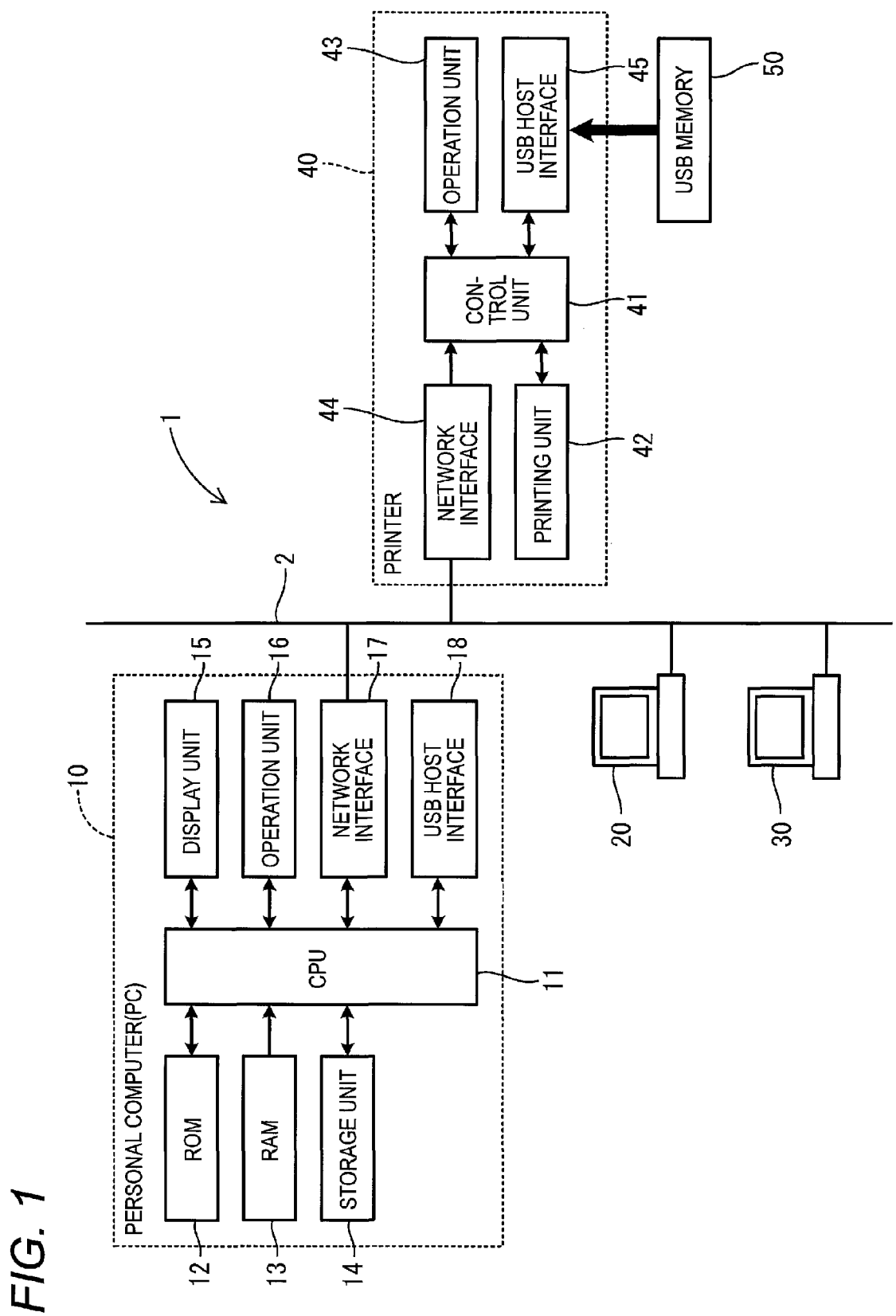
FIG. 1 is a view showing a block diagram of a printing system according to an exemplary embodiment 1.

FIG. 1 shows a printing system 1 includes one or more personal computers 10, 20 and 30 (one example of information processing apparatuses, hereinafter referred to as "PC") and a printer 40 (one example of a printing apparatus). The PCs 10, 20 and 30 and the printer 40 are interconnected and enable communications via a communication network 2 such as a LAN (Local Area Network).

(1-1) Electrical Configuration of the PC

Configurations of the PCs 10, 20 and 30 are substantially identical with one another. Here, only the configuration of the PC 10 will be illustrated as an example.

The PC 10 includes a CPU 11, ROM 12, RAM 13, a storage unit 14, a display unit 15, an operation unit 16, a network interface 17, and a USB (Universal Serial Bus) host interface 18, etc.

The CPU 11 (one example of a generating unit and a storage controlling unit) controls various units in the PC 10 by executing various programs stored in the ROM 12 or storage unit 14. The various programs to be executed by the CPU 11 and various data are stored in the ROM 12. The RAM 13 is used as a main storage device when the CPU 11 executes the various programs.

The storage unit 14 is an external storage device, which stores various programs and data, configured by a non-volatile memory device such as a hard disk or a flash memory. An operating system (OS), a printer driver for the printer 40 and various application programs, which request the printer driver to print print-jobs through the OS, are stored in the storage unit 14.

The display unit 15 (one example of a requesting unit) is configured by a display device such as a CRT or an LCD and a driver circuit driving the display device.

The operation unit 16 (one example of a selecting unit) is configured by a mouse or a keyboard, etc.

The network interface 17 is connected to an external apparatus such as the printer 40 through the communication network 2. In addition, the PC 10 may be directly connected to the printer 40 by a USB interface or RS-232C interface, etc.

The USB host interface 18 (one example of a first connecting unit) is configured by a USB host controller and a USB port, which is connected to a removable USB mass storage device (one example of a removable storage medium) such as a USB memory 50 or a USB hard disk.

(1-2) Electrical Configuration of the Printer

The printer 40 includes a control unit 41, a printing unit 42, an operation unit 43, a network interface 44, and a USB host interface 45, etc.

The control unit 41 (one example of a control unit) includes a CPU, ROM, and RAM. The CPU controls each unit in the printer 40 by executing a printer-controlling program stored in the ROM. The various programs including the printer-controlling program or various data are stored in the ROM. The RAM (one example of a storage unit) is used as a main storage device when the CPU executes the various programs. Further, the RAM is also used as a memory device temporarily storing the print-job or identification information received from the PC, etc.

The printing unit 42 (one example of a printing unit) executes the print-jobs and prints images on the recording medium such as a paper by a laser method, a LED method or an ink-jet method.

The operation unit 43 includes, for example, various buttons or a liquid crystal display used for the operation of the printer 40 by the user.

The network interface 44 (one example of an input unit and a receiving unit) is connected to an external apparatus, such as the PC 10, through the communication network 2.

The USB host interface 45 (one example of a connecting unit and a second connecting unit) configured by a USB host controller and a USB port, which is connected to a removable USB mass storage device, such as the USB memory 50 or USB hard disk.

(2) Program Configuration of the Printing System

Figure 2:
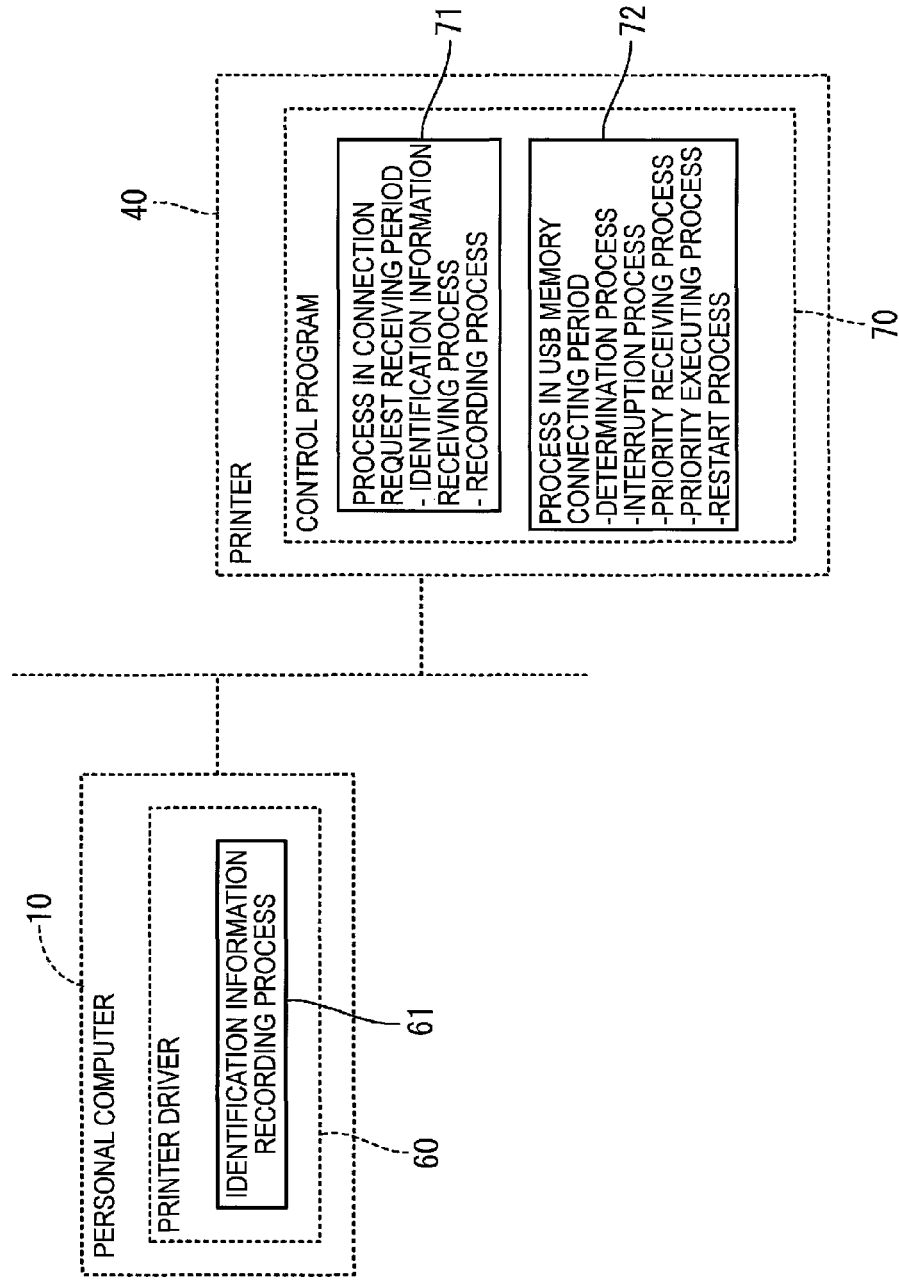
FIG. 2 is a view showing a block diagram of a logical configuration of the printing system.

FIG. 2 is a view showing a block diagram of a logical configuration of the printing system. Program configurations of the PCs 10, 20 and 30 are substantially identical with one another. Here, only one of the program configurations of the PC 10 will be illustrated as an example.

A printer driver 60 is a program, which executes a print-job generating process (not shown) that generates the print-job, which executes a print-job transmitting process (not shown) that transmits the generated print-job to the printer 40, and which executes an identification information recording process 61 that records identification information of the generated print-job on the USB memory 50. The identification information recording process 61 will be described in detail.

The identification information of the print-job is information for identifying uniquely the print-job. The identification information is allocated to the each print-job by the print-job generating process. The identification information is used, for example, a combination of an address (IP address or domain name) of the PC and a counted number incremented by generating each print-job; or a combination of the address of the PC and a character line showing the day and time that each print-job is generated.

Meanwhile, the identification information does not have to be allocated to each print-job, but the address of the PC may be used as the identification information of the print-jobs. In this case, the print-job, which is generated at the earliest time by the PC that is specified by the corresponding address and waiting to be transmitted, may be the print-job uniquely identified by the address.

The identification information may be a portion of the data showing the print-job. For example, when a plurality of the print-jobs can be distinct from each other by using 100-bytes of data from the head of the data showing the print-job, the 100-bytes of the data from the head may be used as the identification information.

The printer-controlling program 70 executes the print-job received from the PC 10 and executes the printing process that prints the image onto the recording medium.

A print-mode in the printer-controlling program 70 includes a normal print-mode and a priority print-mode. In the normal print-mode, the print-job first input from the network interface 44 is executed first. In the priority print-mode, when the USB memory 50 is connected to the USB port, the print-job identified by the identification information stored in the connected USB memory 50 is executed with priority over at least one print-job, which is input from the network interface 44 in an earlier time than the print-job identified by the identification information. A process in connection request receiving period 71 (one example of an identification information receiving process and a recording process) and a process in USB memory connecting period 72 (one example of a determination process, a stopping process, a priority receiving process and a priority execution process) are the processes executed in the priority print-mode. The detailed explanation will be described later.

(3) The Normal Print-Mode

Figure 3:
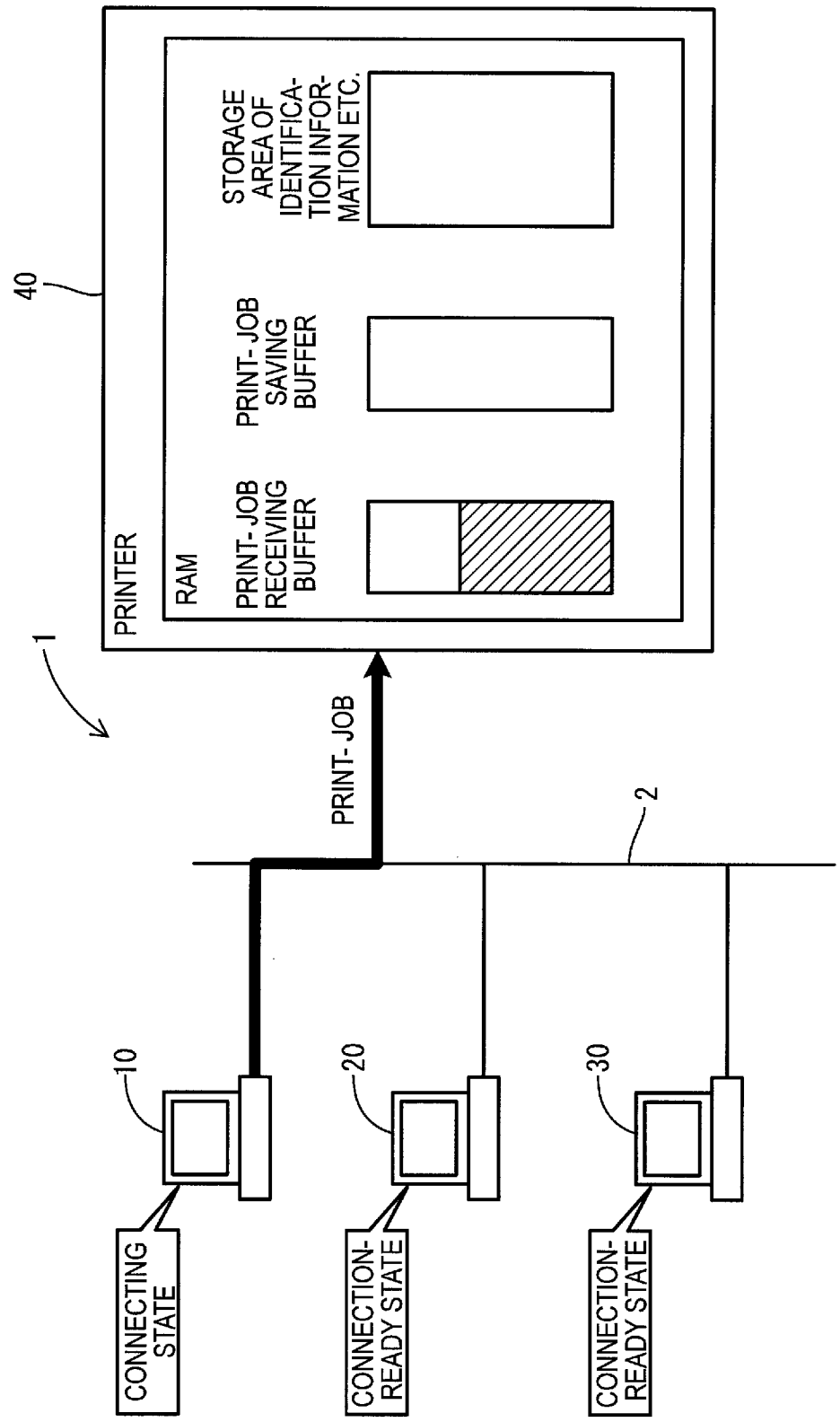
FIG. 3 is a view showing a conceptual schematic view illustrating a normal print-mode.

FIG. 3 is a view showing a conceptual schematic view illustrating a normal print-mode. The PC 10 generates the print-job and transmits a connection request to the printer 40 in order to transmit the generated print-job to the printer 40. When the printer 40 receives the connection request, the printer 40 accept the connection request from the PC 10 if the printer 40 is not receiving the print-job from other PCs, and then the PC 10 is connected to the printer 40. When the PC 10 is connecting to the printer 40, the PC 10 begins to transmit the print-job to the printer 40.

If the other PC 20 or 30 transmit connection requests to the printer 40 when the PC 10 is transmitting the print-job to the printer 40, the printer 40 does not accept the connection requests from the PC 20 or 30 because the printer 40 is receiving the print-job from the PC 10. Accordingly, the PC 20 or 30 are in a connection-ready state, and the print-job generated from the PC 20 or 30 are waiting to be transmitted.

After the printer 40 has received the print-job from the PC 10, the print-job waiting to be transmitted is transmitted to the printer 40. The PC 20 and PC 30 transmit each print-job to the printer 40 in the order of transmitting the connection request. After executing the print-job received from the PC 10, the printer 40 executes the print-jobs from the PC 20 and 30 in the order received.

(4) The Priority Print-Mode

FIGS. 4 to 8 are views showing conceptual schematic views illustrating the priority print-mode. Herein, it will be described as an example that the print-job generated from the PC 30 and waiting to be transmitted is executed with priority over a receiving print-job generated from other PC.

Figure 4:
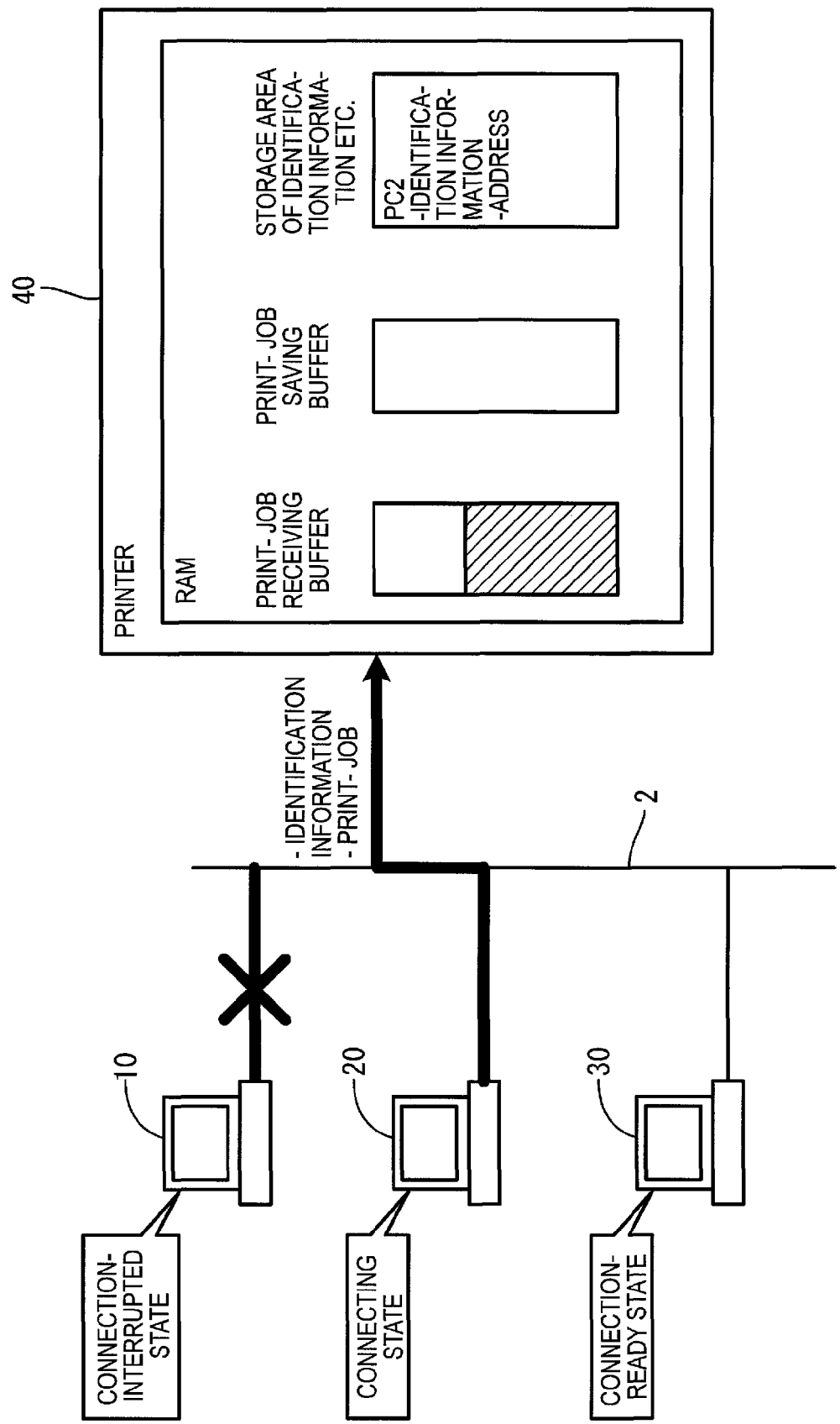
FIG. 4 is a view showing a conceptual schematic view illustrating a priority print-mode.

As shown in FIG. 4, when the printer 40 receives the connection request from the PC 20 while it is receiving the print-job from the PC 10, the printer 40 temporarily interrupts the connection with the PC 10 and connects with the PC 20 to receive the identification information of the print-job waiting to be transmitted and the address of the PC 20. The printer 40 stores their information corresponding to each other. Thereafter, the printer 40 cuts off the connection with the PC 20 and restarts the connection with the PC 10 to receive the remaining portion of the print-job from the PC 10.

Similarly, the printer 40 receives a connection request from the PC 30 and records identification information and an address of the PC 30. The receiving process from the PC 30 is identical with the above-mentioned process in the PC 20. Therefore, a detailed explanation will not be described.

Figure 5:
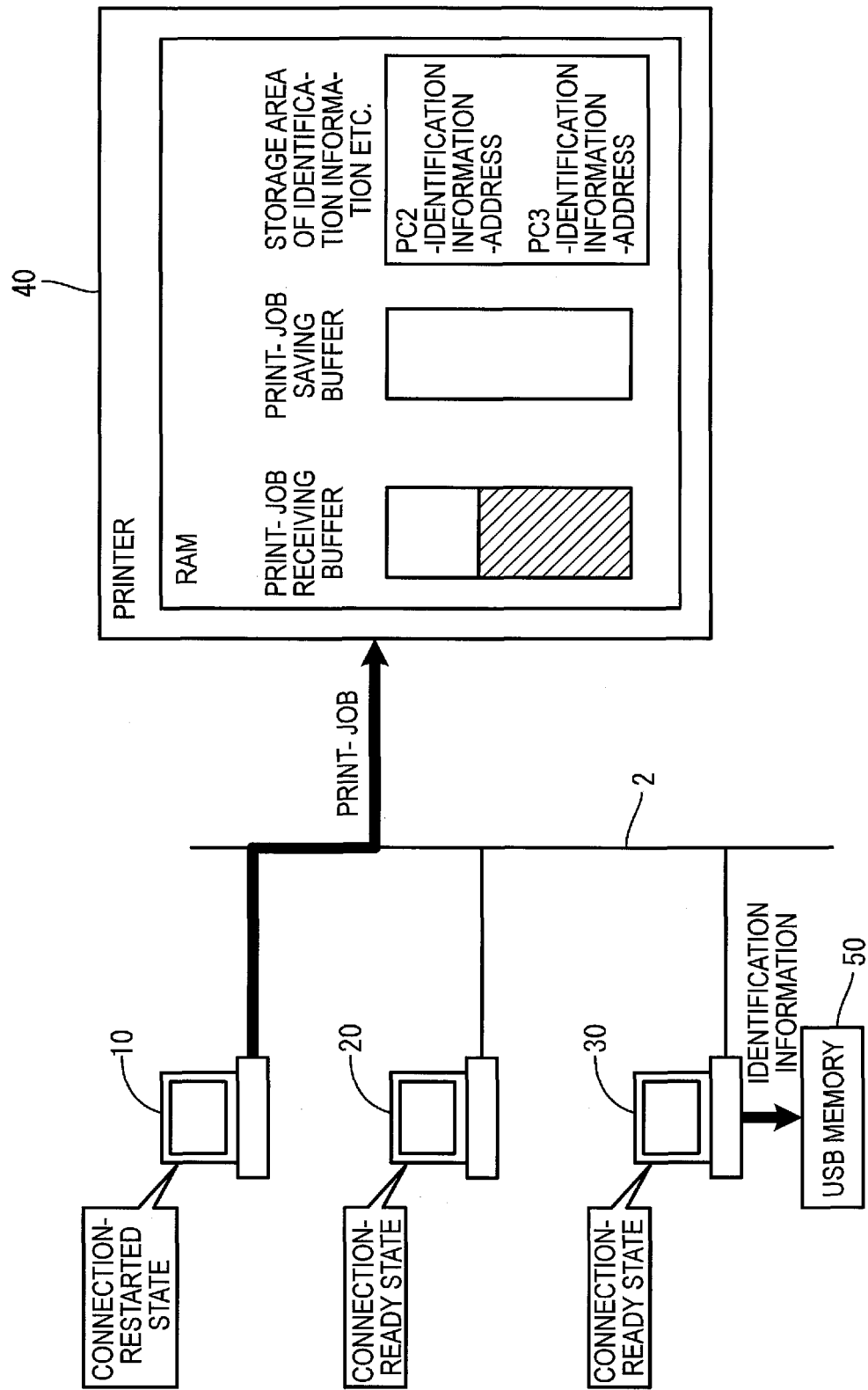
FIG. 5 is a view showing a conceptual schematic view illustrating the priority print-mode.

As shown in FIG. 5, when the PC 30 transmits the identification information of the print-job and its address to the printer 40, the PC 30 stores the identification information being the same as the transmitted identification information to the printer 40 into the USB memory 50.

Figure 6:
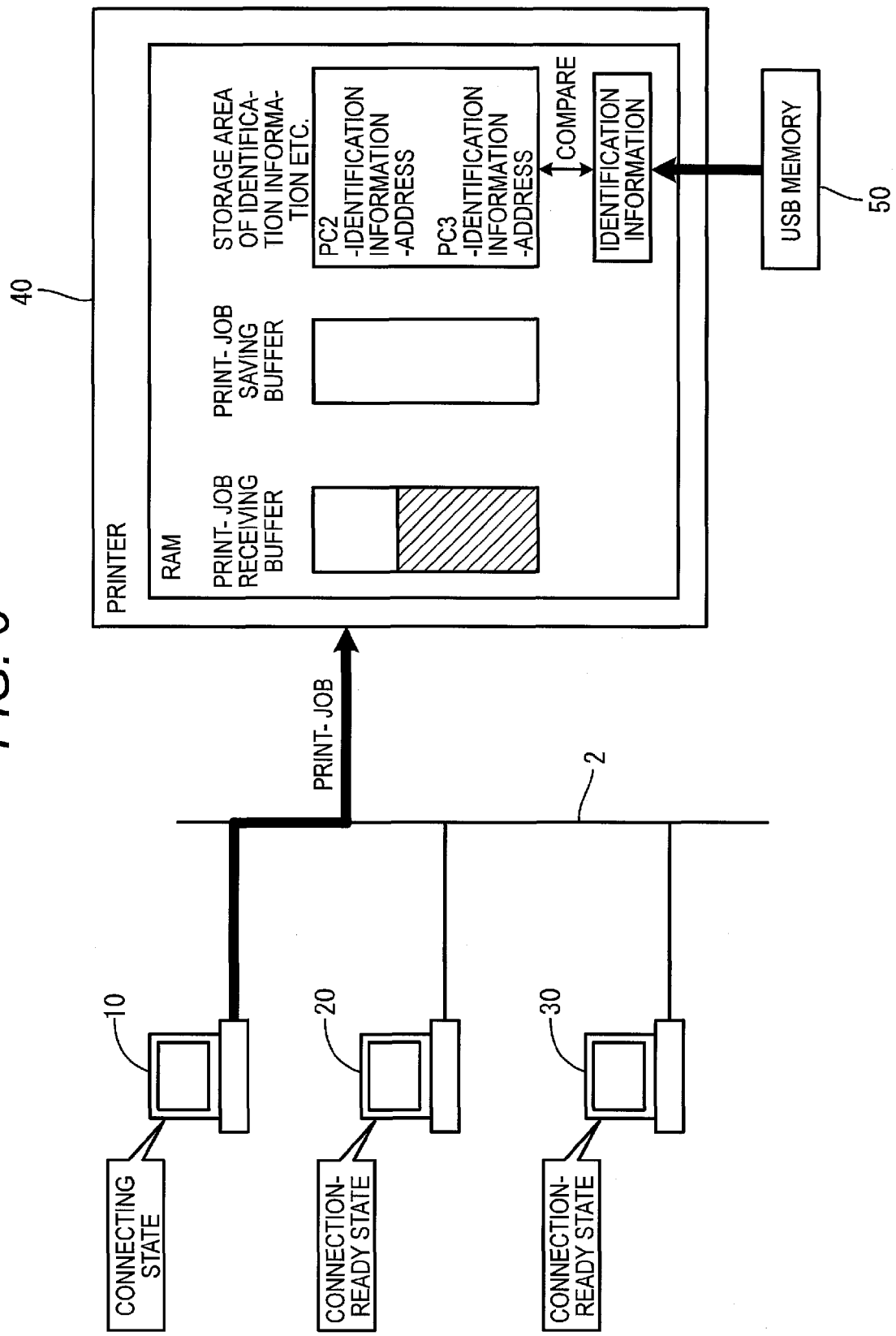
FIG. 6 is a view showing a conceptual schematic view illustrating the priority print-mode.

As shown in FIG. 6, when the user removes the USB memory 50 from the PC 30 and connects the USB memory 50 to the printer 40, the printer 40 reads the identification information of the print-job from the connected USB memory 50. Then, the printer 40 compares the read identification information with the identification information stored in the RAM of the printer 40 to determine whether they are identical with each other or not. In this example, because the identification information received from the PC 30 is recorded in the RAM, the identification information is identical with each other.

Figure 7:
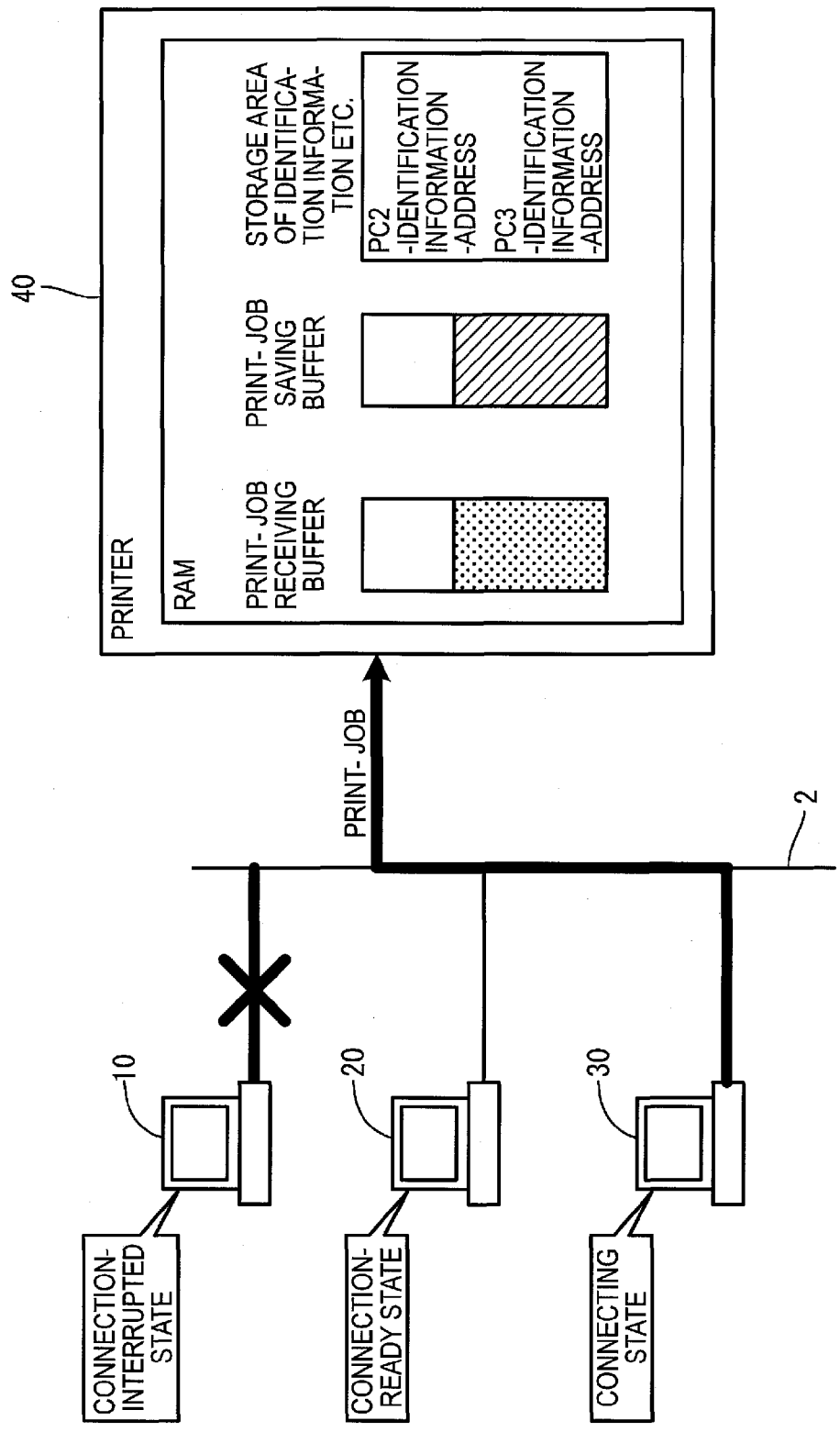
FIG. 7 is a view showing a conceptual schematic view illustrating the priority print-mode.

As shown in FIG. 7, if the identification information is identical with each other, the printer 40 interrupts the connection with the PC 10 and saves the print-job partially received from the PC 10 into the saving buffer. After that, the printer 40 connects with the PC 30 that is specified by the address corresponding to the identified identification information recorded in the RAM, and the printer 40 receives the print-job waiting to be transmitted and identified by the identification information. The printer 40 receives the print-job from the PC 30 and begins to execute the print-job.

Figure 8:
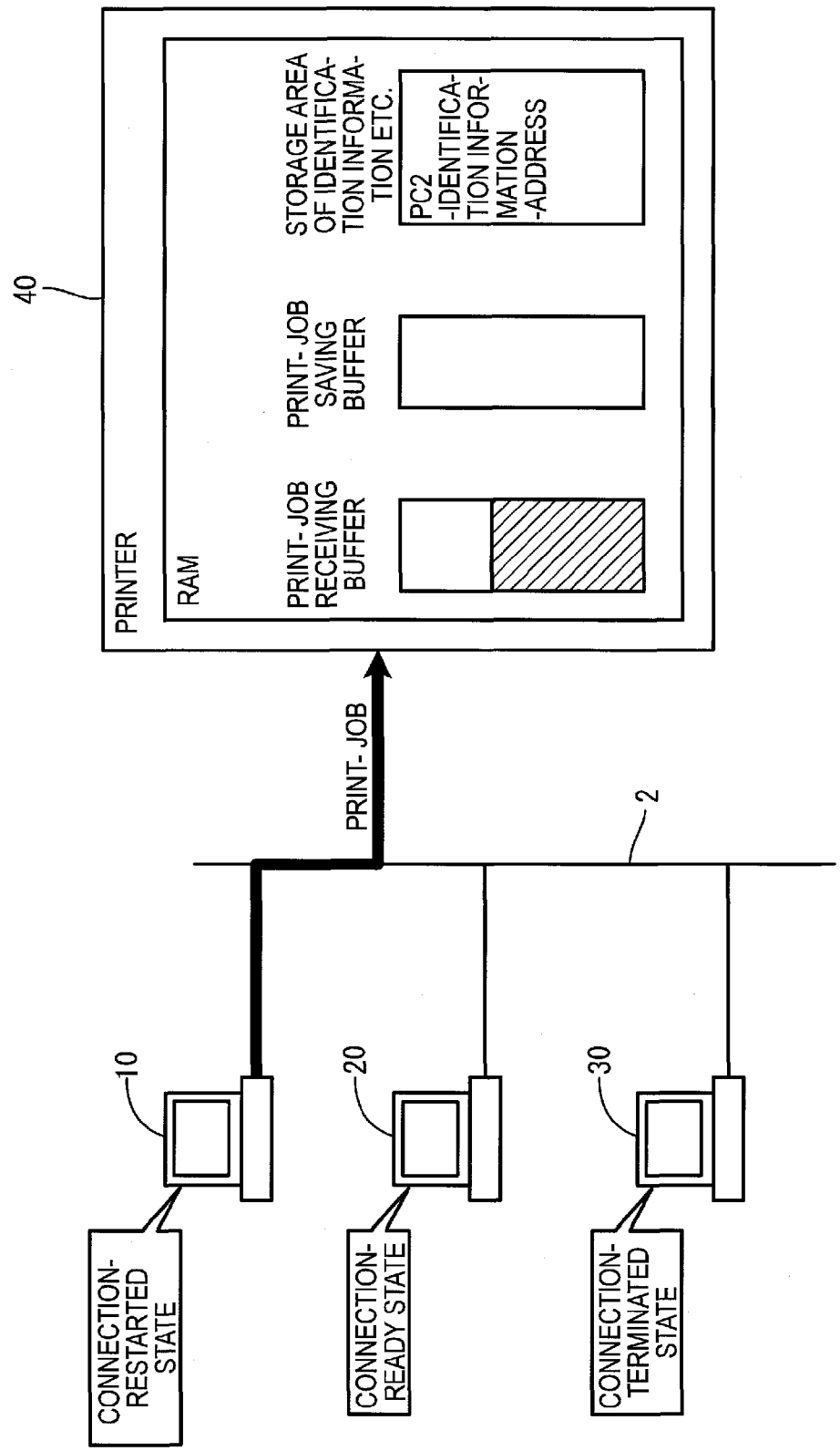
FIG. 8 is a view showing a conceptual schematic view illustrating the priority print-mode.

As shown in FIG. 8, when the printer 40 has received the print-job from the PC 30, the printer 40 returns the saved print-job in the saving buffer to the receiving buffer. Then, the printer 40 restarts the connection with the PC 10 and receives the remaining portion of the print-job from the PC 10.

(5) Process of the Printing System

Next, processes executed by the printing system 1 in order to implement the above-mentioned priority print-mode will be described.

(5-1) Identification Information Recording Process

Figure 9:
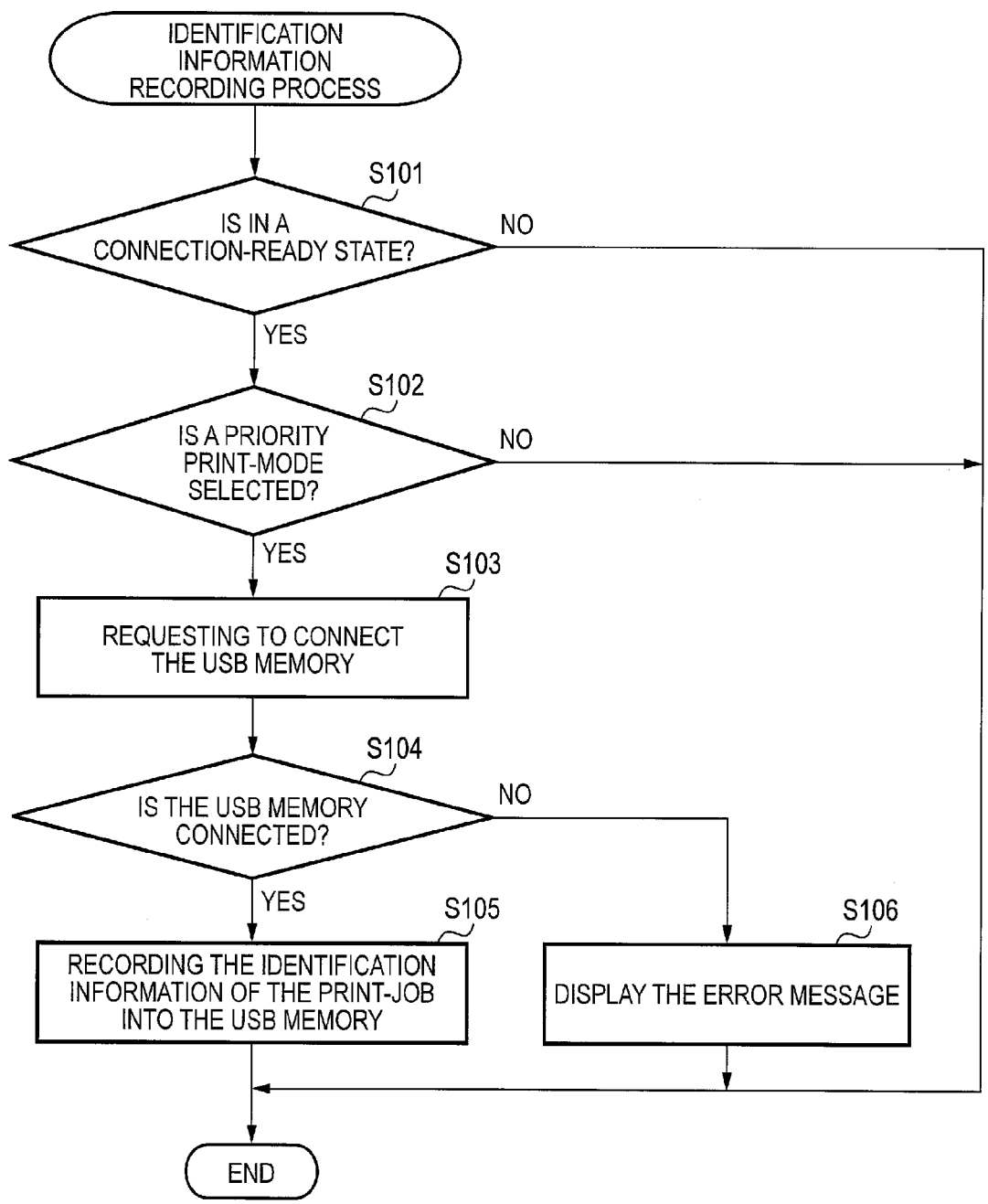
FIG. 9 is a view showing a flow chart of an identification information recording process.

FIG. 9 is a view showing a flow chart of an identification information recording process. When the PC 10 executing a printer driver 60 (hereinafter, referred to as "the printer driver 60") generate the print-job and when the connection request is transmitted to the printer 40, the identification information recording process is executed.

Here, when the transmitted connection request from the printer driver 60 to the printer 14 is accepted, the print-job is transmitted from the printer driver 60 to the printer 40 before a flow chart of FIG. 9 starts. When the transmitted connection request from the printer driver 60 to the printer 14 is not accepted, both the identification information of the print-job and the address of the PC 10 are transmitted from the printer driver 60 to the printer 40 before the flow chart of FIG. 9 starts.

In step S101, the printer driver 60 determines whether the PC 10 is in a connection-ready state or not. If the printer driver 60 determines that the PC 10 is in a connection-ready state, the process proceeds to a step S102. If it determines that the PC 10 is not in a connection-ready state, the printer driver 60 ends the process.

In step S102, the printer driver 60 causes the user to select whether to execute the priority print-mode or not. For a specific example, the printer driver 60 makes the display unit 15 display a selection window for selecting whether to execute the priority print-mode or not. Then, the printer driver 60 causes the user to select whether to execute the priority print-mode or not. In addition, a setting item for setting the priority print-mode may be displayed on the setting screen for setting the printing conditions to generate the print-job, and then the user may select the print-mode. When the user selects "executing the priority print-mode", the printer driver 60 proceeds to step S103. When the user does not select "executing the priority print-mode", the printer driver 60 ends this process.

In step 103, the printer driver 60 makes the display unit 15 display a request message to connect the USB memory 50 to the PC 10.

In step 104, the printer driver 60 determines whether the USB memory 50 is connected to the USB port or not. If the USB memory 50 is connected to the USB port, the printer driver 60 proceeds to step S105. If the USB memory 50 is not connected to the USB port for a given time (for example, 10 seconds), the printer driver 60 proceeds to step S106.

In the step S105, the printer driver 60 records identification information being the same as the transmitted identification information to the printer 40 in the USB memory before starting this process.

In the step S106, the printer driver 60 makes the display unit 15 display an error message notifying the fact that "the USB memory 50 is not connected to the PC" and ends this process.

(5-2) Process in the Connection Request Receiving Period

Figure 10:
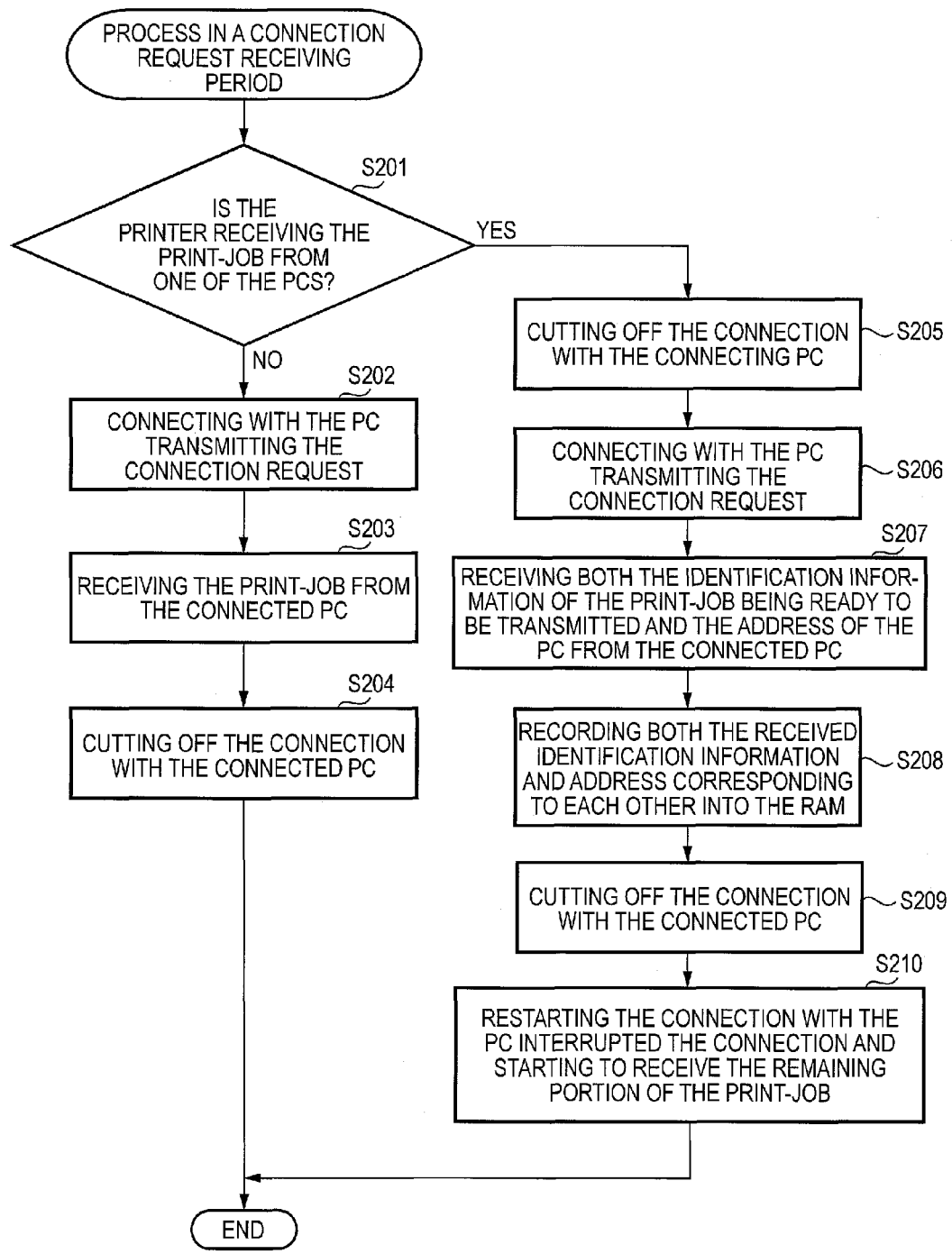
FIG. 10 is a view showing a flow chart of a process in a connection request receiving period.

FIG. 10 is a view showing a flow chart of a process in a connection request receiving period. This process starts when the printer 40 receives the connection request from the PC (PC 10, 20 or 30).

In step S201, the printer 40 executing the printer-controlling program 70 (hereinafter referred to as "the printer-controlling program 70") determines whether the printer 40 is receiving the print-job from any one of the PCs or not. If the printer 40 is receiving the print-job, the process proceeds to step S205. If the print-job is not receiving, the process proceeds to step S202.

In the step S202, the printer-controlling program 70 connects with the PC that transmits the connection request.

In step S203, the printer-controlling program 70 receives the print-job from the connected PC.

In step S204, after the print-job is completed, the printer-controlling program 70 cuts off the connection with the PC and prints the image by executing the print-job.

In step S205, the printer-controlling program 70 interrupts the connection with the PC being connected.

In step S206, the printer-controlling program 70 connects with the PC that transmits the connection request.

In step S207, the printer-controlling program 70 receives both the identification information of the print-job being ready to be transmitted and the address of the PC from the connected PC.

In step S208, the printer-controlling program 70 records both the received identification information and address corresponding to each other on the RAM.

In step S209, the printer-controlling program 70 cuts off the connection with the connected PC.

In step S210, the printer-controlling program 70 restarts the connection with the PC interrupted the connection in the step S205, and then starts to receive the remaining portion of the print-job from the PC.

(5-3) Process in a USB Memory Connecting Period

Figure 11:
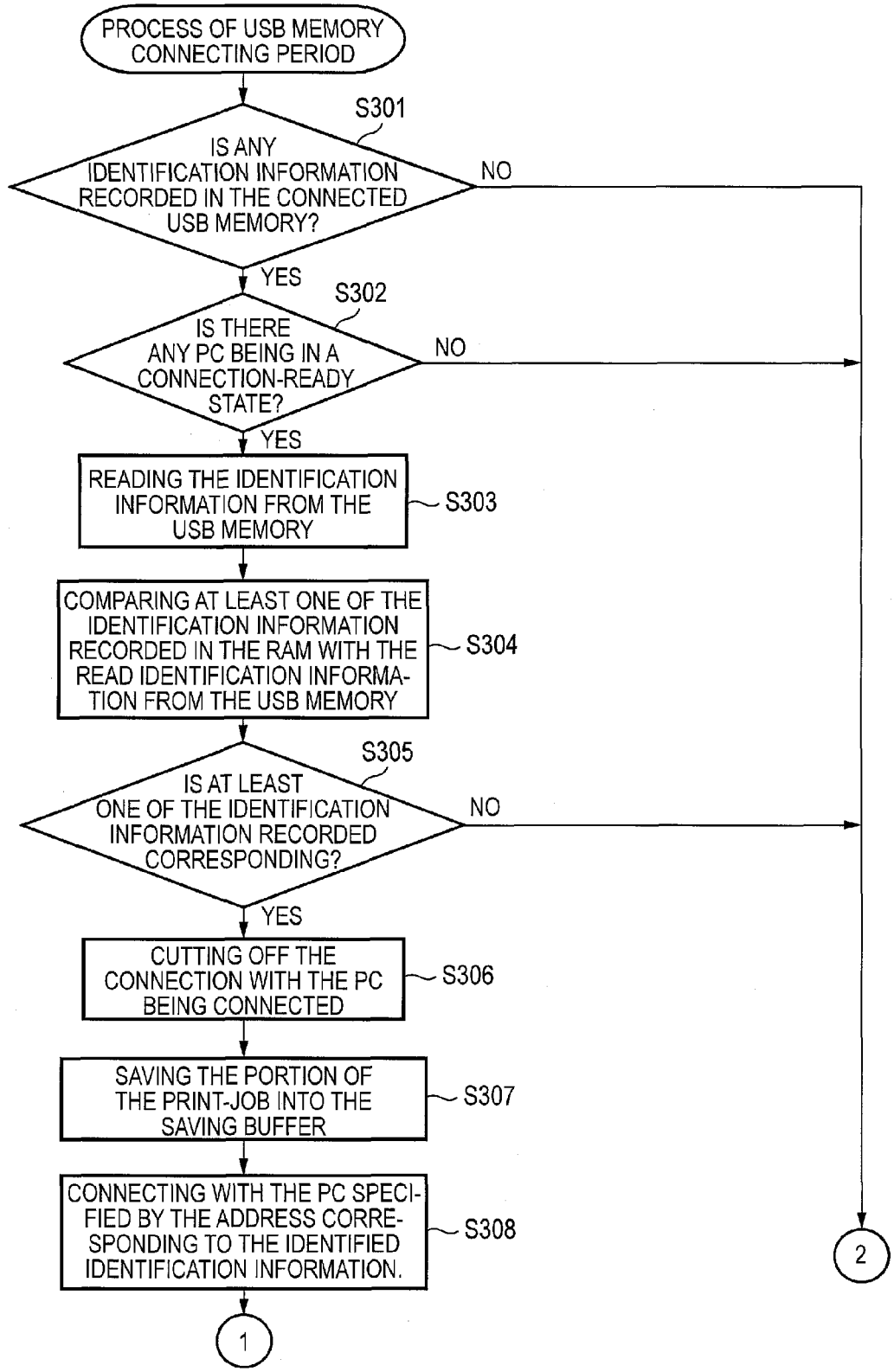
FIG. 11 is a view showing a flow chart of a first-half of a process in a USB memory connecting period.
Figure 12:
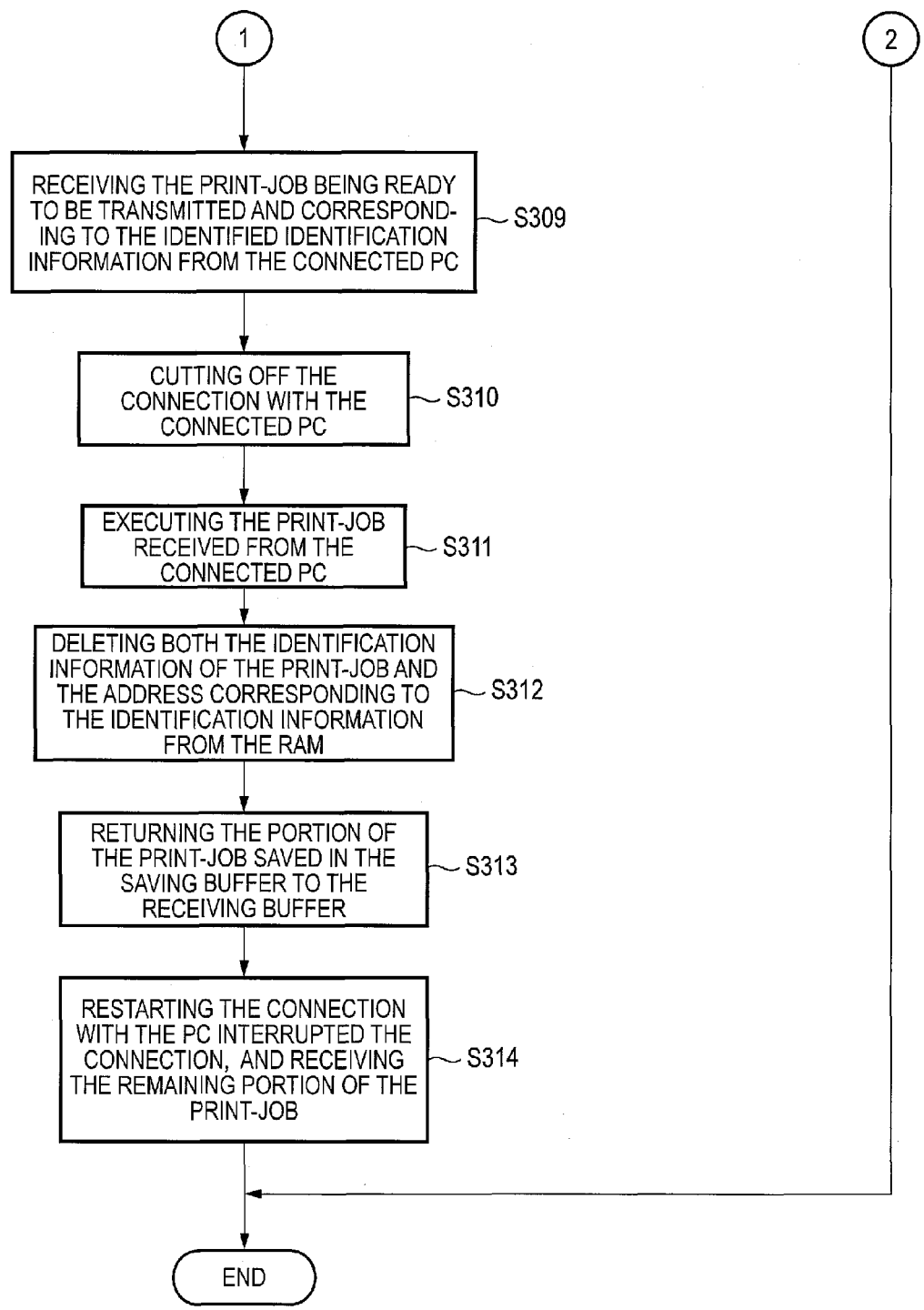
FIG. 12 is a view showing a flow chart of a last-half of the process in the USB memory connecting period.

FIG. 11 and FIG. 12 are views showing a flow chart of the process in the USB memory connecting period. This process starts when the USB memory 50 is connected to the USB port of the printer 40 while the printer 40 is receiving the print-job from any one of the PCs.

In step S301, the printer-controlling program 70 determines whether any identification information is stored in the connected USB memory 50 or not. If identification information is stored in the connected USB memory 50, this process proceeds to step S302. If any identification information is not stored in the connected USB memory 50, the printer-controlling program 70 ends this process.

In step S302, the printer-controlling program 70 determines whether there exists or not any PC being in a connection-ready state.

For specific example, if at least one of the PCs is in the connection-ready state, at least one of the identification information is stored in the RAM in the step S208. Therefore, when at least one of the identification information is stored in the RAM, the printer-controlling program 70 determines that at least one of the PCs is in the connection-ready state.

Then, when at least one of the PCs is in the connection-ready state, the printer-controlling program 70 proceeds to step S303. On the other hand, if any one of the PCs are not in the connection-ready state, there is not a print-job being transmitted and a print-job is not to be executed with priority over the print-job being received. At this case, the printer-controlling program 70 ends this process.

In step S303, the printer-controlling program 70 reads the identification information from the USB memory 50.

In step S304, the printer-controlling program 70 compares at least one of the identification information stored in the RAM in the step S208 with the read identification information from the USB memory 50.

In step S305, the printer-controlling program 70 determines whether at least one of the identification information stored in the RAM in the step S208 is identical with the read identification information from the USB memory 50. If the identification information is corresponding to each other, the process proceeds to step S306. If the identification information is not corresponding to each other, the process proceeds to the end.

In step S306, the printer-controlling program 70 interrupts the connection with the PC being connected.

In step S307, the printer-controlling program 70 saves the portion of the print-job into the saving buffer, which is receiving from the PC interrupted the connection in the step S306 and is stored in the receiving buffer.

In step S308, the printer-controlling program 70 connects with the PC specified by the address stored in the RAM and corresponding to the identified identification information.

In step S309, the printer-controlling program 70 receives the print-job being ready to be transmitted and corresponding to the identified identification information from the connected PC.

In step S310, the printer-controlling program 70 interrupts the connection with the connected PC.

In step S311, the printer-controlling program 70 starts to execute the print-job received from the connected PC.

In step S312, the printer-controlling program 70 deletes both the identification information of the print-job and the address corresponding to the identification information from the RAM.

In step S313, the printer-controlling program 70 returns the portion of the print-job saved in the saving buffer in the step S307 to the receiving buffer.

In step S314, the printer-controlling program 70 restarts the connection with the interrupted connection in the step S306 and receives the remaining portion of the print-job.

(6) Effects of the Exemplary Embodiment 1

According to the printing system 1 of the exemplary embodiment 1 as described above, the user who wants to execute the intended print-job with priority over other print-jobs may execute the intended print-job by just connecting the USB memory 50 storing an identification information of the intended print-job to the USB port of the printer 40. Thus, the intended print-job with priority over at least one print-job, which begins to be input to the network interface 44 of the printer 40 in an earlier time than the intended print-job, may be executed. Accordingly, the intended print-job may be executed with priority by using the simple operations.

According to the printing system 1, when the USB memory is connected to the printer 40 while the printer 40 is receiving the print-job, the printer 40 stops receiving the print-job. Then, the printer 40 receives and executes with priority the print-job being ready to be transmitted from the PC corresponding to the read identification information from the USB memory 50. In this way, the user may reduce the waiting time for the execution of the intended print-job, by reducing at least the time for receiving the remaining portion of the print-job that was previously being received from the PC. The printer 40 may execute the print-job being ready to be transmitted at an earlier time. Accordingly, when the printer 40 is receiving the print-job, the printing system may be more conveniently for the user, who intends to execute the print-job being ready to be transmitted with priority over the print-job being received.

Further, according to the printing system 1, when the printer 40 receives the connection request from any one of the PCs while the printer 40 is receiving the print-job, the printer 40 also receives the identification information of the print-job being ready to be transmitted from the PC requesting the connection to the printer 40. Therefore, when the USB memory 50 is connected to the USB port of the printer 40, the intended print-job may begin to be executed in an earlier time than a process that the identification information is received from the PC after the USB memory 50 is connected to the USB port of the printer 40.

Furthermore, according to the printing system 1, the printer 40 restarts reception of the print-job interrupted the receiving process. It is not necessary to retransmit the interrupted print-job.

Moreover, according to the printing system 1, the system 1 makes the user select whether to execute the priority print-mode or not. Then, if the user selects executing the priority print-mode, the system 1 requests the user to connect the USB memory 50 to the USB port of the PC. Accordingly, the identification information of the intended print-job may be more securely stored on the USB memory 50.

<Exemplary Embodiment 2>

The exemplary embodiment 2 will be described with reference to FIGS. 13 to 15.

In this embodiment, the identification information is not received from the PC when the connection request from the PC is transmitted to the printer 40. Instead, in the exemplary embodiment 2, when the connection request from the PC is transmitted to the printer 40, only the address of the PC is recorded in the RAM. After that, the identification information is received when the USB memory 50 is connected to the printer 40.

Figure 13:
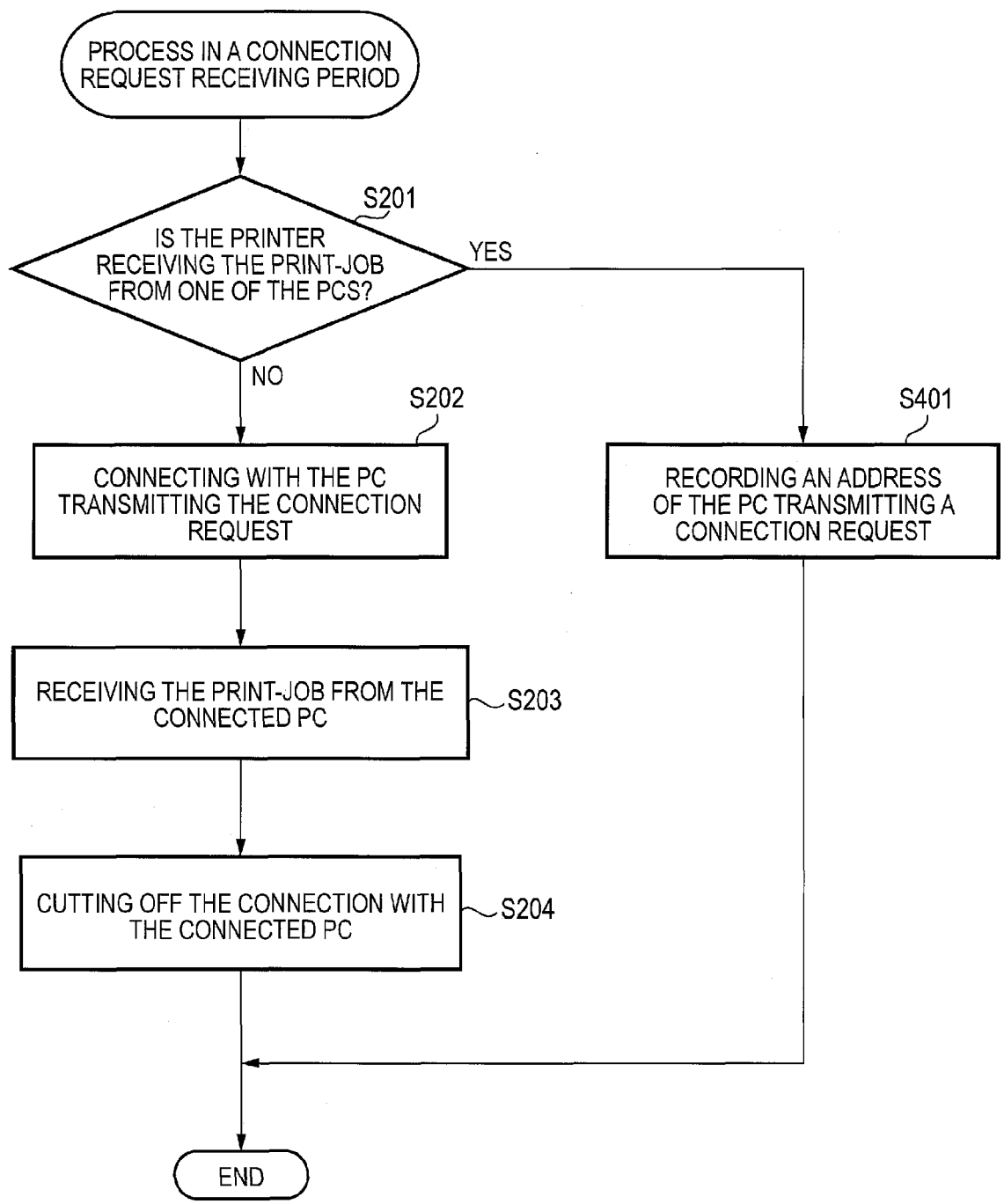
FIG. 13 is a view showing a flow chart of a process in a connection request receiving period according to an exemplary embodiment 2.

FIG. 13 is a view showing a flow chart of a process in a connection request receiving period, according to an exemplary embodiment 2. When the printer 40 receives the connection request from the PC (PC 10, 20 or 30), the process in a connection request receiving period is started. Herein, steps that are substantially similar to the steps in the exemplary embodiment 1 have the same reference numerals, and their detailed explanation will be omitted.

During the process of a connection request receiving period according to an exemplary embodiment 2, step S401 is performed instead of the steps S205 to S210 in the embodiment 1.

In the S401, the printer 40 records an address of the PC transmitting a connection request.

Figure 14:
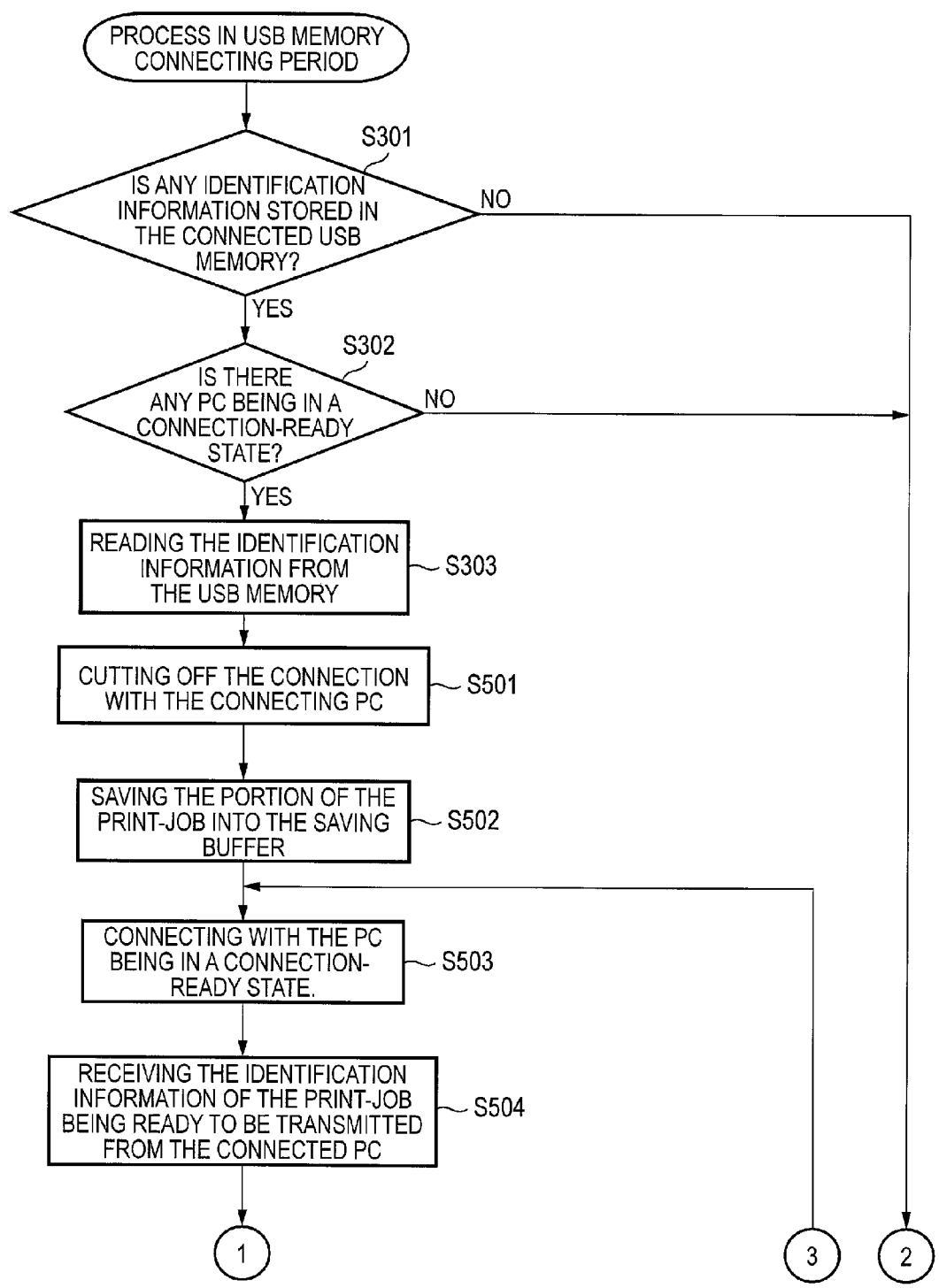
FIG. 14 is a view showing a flow chart of a first-half of a process in a USB memory connecting period, according to the exemplary embodiment 2.
Figure 15:
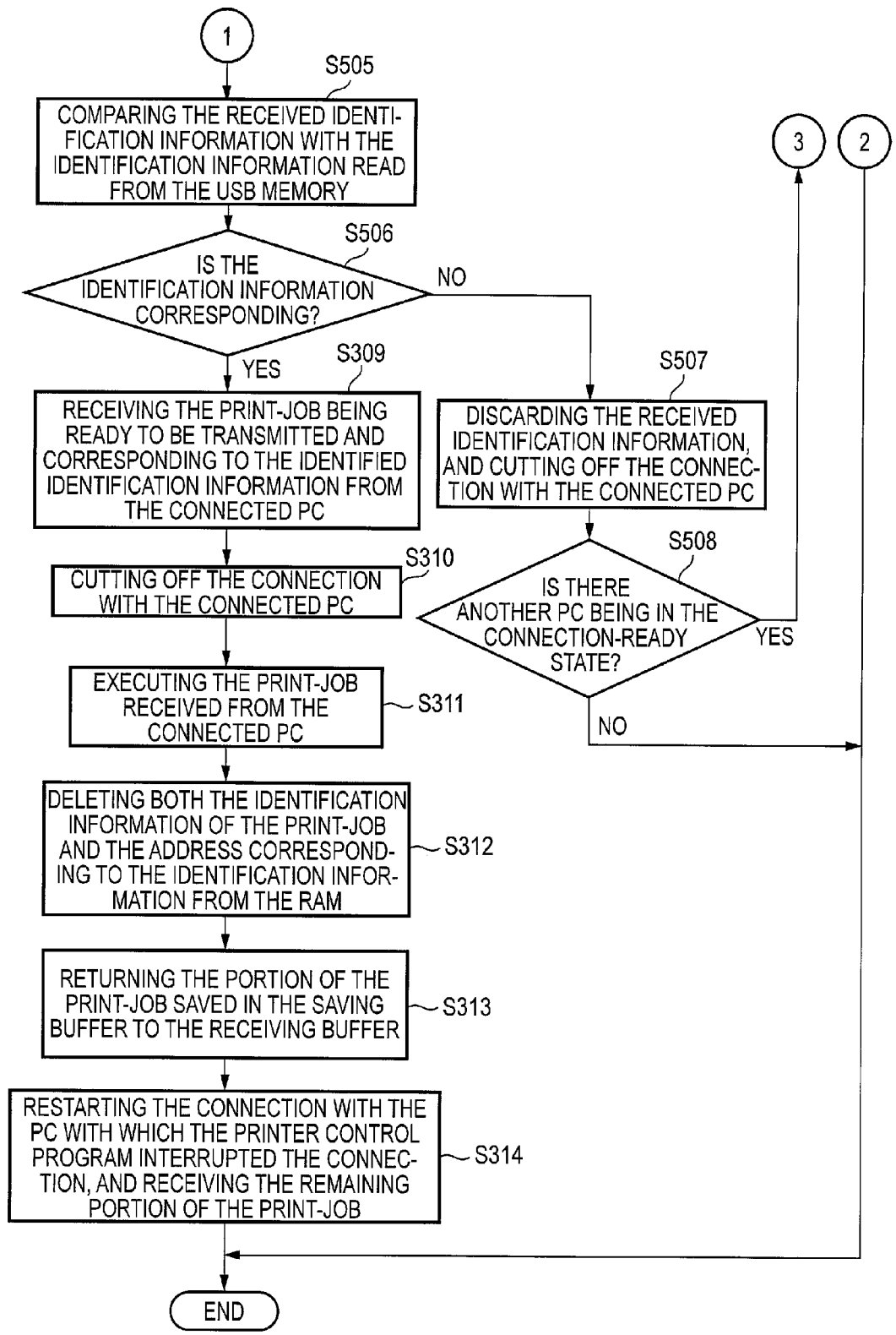
FIG. 15 is a view showing a flow chart of a last-half of a process in the USB memory connecting period according to the exemplary embodiment 2.

FIG. 14 and FIG. 15 are views showing a flow chart of a process in the USB memory connecting period according to the exemplary embodiment 2. The process in the USB memory connecting period is started when the USB memory 50 is connected to the USB port of the printer 40 while the printer 40 is receiving a print-job from any one of the PCs. Herein, steps being substantially the same as the exemplary embodiment 1 have the same reference numerals, and their detailed explanation will be omitted.

In step S501, the printer-controlling program 70 interrupts the connection with the PC being connected.

In step S502, the printer-controlling program 70 saves the portion of the print-job into the saving buffer, which is received from the PC interrupted the connection in the step S501, is stored in the receiving buffer.

In a step S503, the printer-controlling program 70 connects with the PC that is in a connection-ready state.

Specifically, if at least one of the PCs in the connection-ready state, at least one of the address of the PC was stored in the RAM of in the step S401. Therefore, when the printer-controlling program 70 selects one of the address is stored in the RAM, the printer-controlling program 70 connects with the PC specified by the selected address. When step S503 is performed a second or subsequent time, a not yet selected address stored in the RAM will be selected.

In step S504, the printer-controlling program 70 receives the identification information of the print-job being ready to be transmitted from the connected PC.

In step S505, the printer-controlling program 70 compares the received identification information in the step S504 with the identification information read from the USB memory 50.

In step S506, the printer-controlling program 70 determines whether the received identification information in the step S504 is identical with the identification information read from the USB memory 50. If the identification information is corresponding to each other, the process proceeds to step S507. If the identification information is not corresponding to each other, the process proceeds to step S309.

In step S507, the printer-controlling program 70 discards the received identification information in the step S504 and cuts off the connection with the connected PC.

In step S508, the printer-controlling program 70 determines whether another PC is in the connection-ready state. In other words, when the not yet selected address is stored in the RAM, the printer-controlling program 70 returns to the step S503 and executes the step repeatedly. When the not yet selected address is not stored in the RAM, the process proceeds to the end.

According to the printing system of exemplary embodiment 2 described above, the printer 40 may execute the print-job that is ready to be transmitted in the PC with priority over the print-job being received while the printer 40 is receiving the print-job.

According to the printing system of the exemplary embodiment 2, if it is determined that the received identification information from the PC is not identical with the identification information read from the USB memory 50, the reception of the identification information is repeated until an identification information identical with the identification information read from the USB memory 50 is received. Accordingly, even when a plurality of the print-jobs is ready to be transmitted, the user may execute the intended print-job with priority over any other print-jobs that are ready to be transmitted.

<Another Embodiment>

The invention is not limited to the embodiments described in the above specification and drawings. Rather, the following embodiments are included in the scope of the invention.

(1) In the description of the above embodiments, the print-job that is ready to be transmitted is executed with priority over the print-job being received print-job. However, the print-job ready to be transmitted may be executed with priority over not only the receiving print-job.

For example, when a print-job is currently being executed in the printer, the print job being executed may be interrupted, and the print-job that is ready to be transmitted may be executed with priority over the print-job being executed and interrupted.

For example, when a print-job that is currently being executed and a print-job that is ready to be executed are both stored in the printer, the print-job that is ready to be transmitted may be executed with priority over the print-job being executed. However, the print-job that is ready to be transmitted may be executed with priority over the print-job that is ready to be executed.

For another example, when there are a print job being received print-job, a print-job being executed and a print-job that is ready to be executed in the printer, the print-job that is ready to be transmitted is not executed with priority over the print job being executed and the print-job that is ready to be executed. However, the print-job that is ready to be transmitted may be executed with priority over the print-job being received.

(2) In the description of the above embodiments, the print-job ready to be transmitted is executed with priority over other print-jobs. However, the print-job executed with priority over other print-jobs is not limited to the print-job ready to be transmitted.

For example, when a USB memory storing an identification information of the print-job ready to be executed is connected to the printer while a print-job being currently executed and a print-job ready to be executed in the printer, the print-job being executed is interrupted. Then, the identified print-job, which is identified by the identification information, and which is being ready to be executed, may be executed with priority over the executing print-job.

For another example, when one print-job being currently executed and a plurality of print-jobs being ready to be executed in the printer, the print-job identified by the identification information may not be executed with priority over the executing print-job, but the identified print-job being ready to be executed may be executed with priority over the other print-jobs being ready to be executed.

(3) In the description of the above embodiments, when the user selects the priority print-mode, the program requests the user to connect the USB memory 50 to the USB port. However, when the print-job is generated while the USB memory 50 is connecting to the USB port, identification information identifying the generated print-job may be recorded on the USB memory without the user's selection.

(4) In the description of the above embodiment, the print-job is input to the printer from the PC through the communication network 2 and is received by the printer. However, the print-job does not need to be received from the PC through the communication network 2. The user may input the print-job into the printer by operating the operation unit 43 of the printer.

(5) In the description of the above embodiment, the USB memory is used as the removable storage medium. However, the removable storage medium is not limited to the USB memory. For example, a storage medium based on a standard other than USB standard, such as the memory card used in a digital camera, etc., may be used as the removable storage medium.

In the description of the above embodiment, after the reception of the print-job has been completed, the print-job begins to be executed. However, the printer may begin to execute the print-job while the printer is receiving the print-job. In this case, the print-job may begin to be executed at the time when data fitting to one piece of the recording medium has been stored on the receiving buffer.

What is claimed is:

1. A printing apparatus comprising:
  a storage unit;
  an input unit that is a receiving unit that receives a print job from at least one information processing apparatus communicatably connected to the printing apparatus;
  a printing unit, which executes the print-job input through the input unit, and which prints an image onto a recording medium;
  a connecting unit that is connectable to a removable storage medium; and
  a control unit that:
    reads identification information of the print-job from the connected removable storage medium when the storage medium is connected to the connecting unit,
    initiates a priority printing process that causes the printing unit to execute the print-job identified by the read identification information with priority over at least one print-job that starts being input to the input unit at a time earlier than when the print-job identified by the read identification information started being input,
    interrupts the reception of the print-job by the receiving unit,
    causes the receiving unit to receive a print-job, which is identified by the identification information read from the storage medium, and which is ready to be transmitted, from the at least one information processing apparatus with priority,
    causes the receiving unit to receive the identification information of a print-job that is ready to be transmitted from the information processing apparatus that transmits the connection request when the receiving unit receives a connection request from the at least one information processing apparatus while the receiving unit is receiving the print-job,
    causes the storage unit to record both the received identification information and an address of the information processing apparatus, which is transmitting the connection request, and which corresponds with each other into the storage unit,
    determines whether the identification information read from the storage medium is identical with the identification information stored in the storage unit when the storage medium is connected to the connecting unit while the receiving unit is receiving a print-job,
    causes the receiving unit to interrupt the reception of the print-job when the control unit determines that the identification information read from the storage medium is identical with the stored identification information in the storage unit,
    causes the receiving unit to receive a print-job identified by the identification information with priority from the information processing apparatus specified by the address, which is recorded in the storage unit, and which corresponds to the identification information read from the storage medium when a reception of the print-job is interrupted,
    causes the printing unit to execute the print-job received by the priority printing process with priority over the print-job the reception of which was interrupted.

2. The printing apparatus according to claim 1, wherein the control unit causes the receiving unit to restart the reception of the interrupted print-job after the reception by the priority receiving process is completed.

3. A printing apparatus comprising:
  a storage unit;
  an input unit that is a receiving unit that receives a print job from at least one information processing apparatus communicatably connected to the printing apparatus;
  a printing unit, which executes the print-job input through the input unit, and which prints an image onto a recording medium;
  a connecting unit that is connectable to a removable storage medium; and
  a control unit that:
    reads identification information of the print-job from the connected removable storage medium when the storage medium is connected to the connecting unit,
    initiates a priority printing process that causes the printing unit to execute the print-job identified by the read identification information with priority over at least one print-job that starts being input to the input unit at a time earlier than when the print-job identified by the read identification information started being input,
    interrupts the reception of the print-job by the receiving unit,
    causes the receiving unit to receive a print-job, which is identified by the identification information read from the storage medium, and which is ready to be transmitted, from the at least one information processing apparatus with priority,
    causes the storage unit to store an address of the information processing apparatus transmitting the connection request when the receiving unit receives a connection request from one of the information processing apparatuses while the receiving unit is receiving a print-job,
    causes the receiving unit to interrupt the reception of the receiving print-job when the storage medium is connected to the connecting unit while the receiving unit is receiving a print-job,
    causes the receiving unit to receive identification information of a print-job that is ready to be transmitted from the information processing apparatus specified by the address stored in the storage unit when a reception of the print-job is interrupted by the interrupt process, wherein the control unit determines whether the received identification information is identical with identification information read from the connected storage medium, causes the receiving unit to receive a print-job, which is ready to be transmitted, and which is identified by the identification information from the information processing apparatus transmitting the connection request with priority when the received identification information is identical with the identification information, causes the printing unit to execute a print-job received by the priority printing process with priority over the print-job the reception of which was interrupted.

4. The printing apparatus according to claim 3, wherein the controller causes the receiving unit to repeatedly receive until the identification information identical with the identification information read from the connected storage medium when it is determined by the control unit that the identification information from the information processing apparatus is not identical with the identification information.

5. A printing system including a printing apparatus and an information processing apparatus connected communicatably with the printing apparatus,
wherein the information processing apparatus comprises:
a generating unit that generates a print-job;
a first connecting unit that is connectable to a removable storage medium; and
a storage controlling unit that causes a connected storage medium to store identification information, which identifies the print-job generated by the generating unit, and
wherein the printing apparatus comprises:
a storage unit;
an input unit through which a print-job is input;
a printing unit, which executes the print-job input through the input unit, and which prints an image onto a recording medium;
a second connecting unit that is connectable to a removable storage medium; and
a control unit that:
reads identification information of the print-job from a connected removable storage medium when the removable storage medium is connected to the second connecting unit,
initiates a priority printing process that causes the printing unit to execute the print-job identified by the read identification information with priority over at least one print-job that starts being input to the input unit at a time earlier than when the print-job identified by the read identification information started being input,
interrupts the reception of the print-job by the receiving unit, causes the receiving unit to receive a print-job, which is identified by the identification information read from the storage medium, and which is ready to be transmitted, from the at least one information processing apparatus with priority, causes the receiving unit to receive the identification information of a print-job that is ready to be transmitted from the information processing apparatus that transmits the connection request when the receiving unit receives a connection request from the at least one information processing apparatus while the receiving unit is receiving the print-job, causes the storage unit to record both the received identification information and an address of the information processing apparatus, which is transmitting the connection request, and which corresponds with each other into the storage unit, determines whether the identification information read from the storage medium is identical with the identification information stored in the storage unit when the storage medium is connected to the connecting unit while the receiving unit is receiving a print-job, causes the receiving unit to interrupt the reception of the print-job when the control unit determines that the identification information read from the storage medium is identical with the stored identification information in the storage unit, causes the receiving unit to receive a print-job identified by the identification information with priority from the information processing apparatus specified by the address, which is recorded in the storage unit, and which corresponds to the identification information read from the storage medium when a reception of the print-job is interrupted, causes the printing unit to execute the print-job received by the priority printing process with priority over the print-job the reception of which was interrupted.

6. The printing system according to claim 5,
wherein the storage controlling unit comprises:
a selecting unit that makes a user select whether to execute a priority print-mode; and
a requesting unit that requests the user to connect the storage medium to the first connecting unit when the priority print-mode is selected.

7. The printing system according to claim 5,
wherein, when a print-job is generated by the generating unit while the storage medium is connected to the first connecting unit, the storage controlling unit causes the storage medium to store the identification information of the print-job generated by the generating unit.

\* \* \* \* \*